Aug. 7, 1962  J. F. BOINEY ETAL  3,048,508
RESINOUS COMPOSITIONS AND COMPOSITE LAMINATED
MEMBERS PRODUCED THEREWITH
Filed June 11, 1958

INVENTORS
Earl L. Schulman and
Joseph F. Boiney.
BY
Frederick Shapoe
ATTORNEY

United States Patent Office 3,048,508
Patented Aug. 7, 1962

3,048,508
RESINOUS COMPOSITIONS AND COMPOSITE LAMINATED MEMBERS PRODUCED THEREWITH
Joseph F. Boiney, Hampton, and Earl L. Schulman, Walterboro, S.C., assignors to Westinghouse Electric Corporation, East Pittsburgh, Pa., a corporation of Pennsylvania
Filed June 11, 1958, Ser. No. 741,352
2 Claims. (Cl. 154—43)

This invention relates to resinous compositions, to composite laminated members produced therewith, and to methods of making such compositions and members.

Electrical grade laminates have been prepared from paper sheet material impregnated with and bonded together by resins of the phenolic type. The electrical properties of paper base electrical grade laminates will depend largely on the type of paper employed. Thus, for example, laminates prepared from alpha cellulose paper have high insulation resistance and relatively high dissipation factors while, on the other hand, kraft paper base laminates have relatively low dissipation factors and poor dielectric insulation resistance.

This invention is directed to the preparation of electrical grade laminates comprising sheets of kraft paper and sheets of highly purified cellulose paper so arranged and treated with resins as to provide a laminate possessing the good electrical properties of both papers. A novel resinous composition is also produced for use in the preparation of these composite laminates.

The object of this invention is to provide composite laminated members having good electrical and mechanical properties and possessing good cold punching characteristics, which laminated members comprise a body layer of kraft paper, sheeting or like strong paper and at least one surface layer of highly purified cellulose paper sheeting, the said sheeting being impregnated and bonded into a unitary member by a specific thermoset phenolic resin composition.

Another object of this invention is to provide a thermosettable phenolic resin adapted for making laminated members that possess good electrical properties, good mechanical properties and good cold-punching characteristics, said phenolic resin comprising the reaction product of certain phenols and substituted phenols with an aldehyde.

Figure 1:
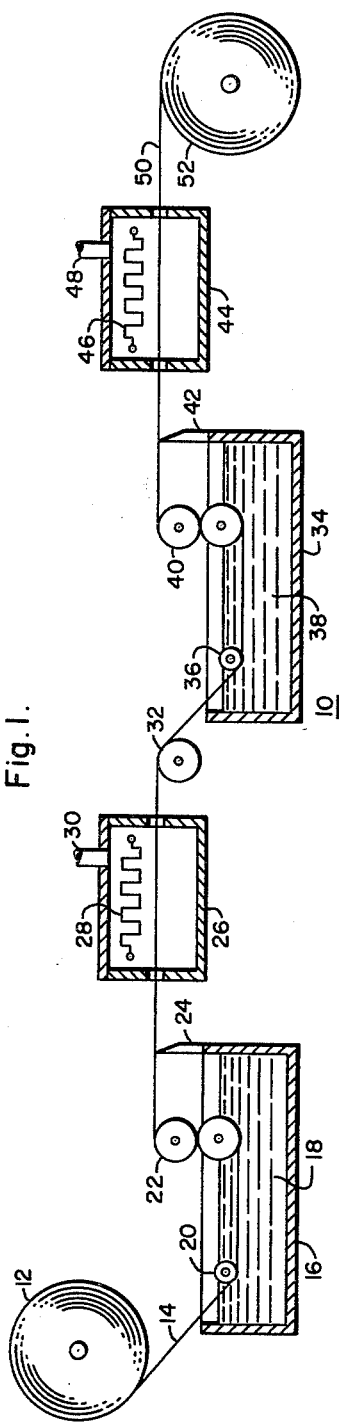
Figure 2:
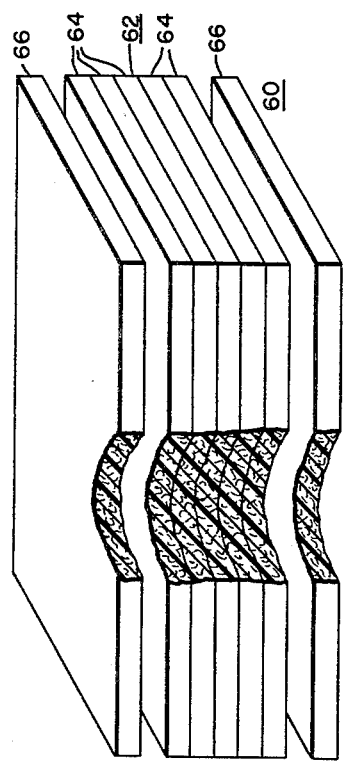

Other objects of this invention will, in part, be obvious and will, in part, appear hereinafter. For a better understanding of the nature and the objects of this invention, reference should be had to the following detailed description and drawing, in which:

FIGURE 1 is a schematic view of apparatus for applying resin varnish to sheet fibrous material; and FIG. 2 is an exploded view in perspective with a portion thereof cut away of the composite laminated member of this invention.

In accordance with this invention, it has been discovered that a composite laminate having good electrical and mechanical properties can be prepared by employing as the filler material therein a combination of kraft paper sheeting or an equivalent strong paper, and highly purified cellulose paper sheeting, such as alpha cellulose paper and cotton linters paper. The composite laminated members prepared in accordance with this invention will comprise a body layer comprising a plurality of sheets of kraft paper and at least one surface layer comprising at least one sheet of highly purified cellulose paper, the said sheets being impregnated and bonded together with a thermoset phenolic resin composition. The method of producing the composite laminated members of this invention will be detailed more fully hereinafter.

Further, in accordance with this invention, a novel resinous composition has been produced, which is applied to the sheets of paper for preparing the composite laminated members of this invention and will provide a laminate having excellent cold-punching characteristics as well as good electrical and mechanical properties.

The novel resinous composition employed in this invention is prepared by reacting (1) one mol of a mixture of phenols composed of (a) from 0.83 to 0.5 mol percent of a phenol selected from at least one of the group consisting of phenol, cresol, and xylenol and (b) from 0.17 to 0.5 mol percent of an alkyl substituted phenol selected from the group consisting of ethyl phenol, isopropyl phenol and mixtures thereof with (2) 0.7 mol to 1.5 mols of formaldehyde or a reactive methylene polymer of formaldehyde such, for example, as paraformaldehyde or other trioxymethylene or mixtures of two or more. An alkaline catalyst such, for example, as ammonia or an organic amine such as ethylene diamine, propylene diamine and triethanolamine or mixtures of two or more is preferably employed in an amount of from 0.1% to 2% of the weight of the phenols, to catalyze the reaction. The reaction is carried out in a conventional reaction vessel provided with condensers, stirrers and the like, under reflux and subsequent vacuum dehydration until there is produced a resin that is clear and substantially free of water. Mixtures of ammonia and ethylene diamine have proved highly satisfactory as a catalyst in preparing the resins of this invention.

It has been found that a varnish composition of the phenolic type should contain a certain amount of drying oils in order to produce satisfactory punch-stock laminates therefrom. Examples of suitable drying oils are Chinawood oil, linseed oil, soya oil, oiticica oil, dehydrated castor oil and safflower oil, and mixtures of two or more. Of the enumerated oils, China-wood oil is preferred. For each part by weight of the phenolic resin, there are added from about .25 to .50 part by weight of drying oil.

It has been determined that a blend of alkyl substituted phenols is particularly suitable as component (b) in admixture with component (a) in preparing the novel resinous composition of this invention. The blend will comprise ethyl phenols and isopropyl phenols as the major ingredients, with small amounts of up to about 10% of other substituted phenols such as phenyl phenols being present. Some phenol (hydroxy-benzene) may also be present.

Blends of substituted phenols that have been satisfactorily employed are those that comprise, by weight, from about 2% to 5% of phenol (hydroxy-benzene), about 8% to 10% of ortho-phenyl phenol, and from about 85% to 90% of ethyl phenols and isopropyl phenols, with about 90% of the ethyl phenols and isopropyl phenols being the para isomer. For every part, by weight, of isopropyl phenols present, there will be from about 1.3 to 1.6 parts by weight of ethyl phenols present. Small amounts of the di-ethyl phenols and the diisopropyl phenols may also be present.

EXAMPLE I

An example of a suitable blend of substituted phenols for use in this invention is a blend that meets the following specification:

*Engler Distillation*

Initial boiling point, about 400° F.
10% over at about 414° F.
50% over at about 422 ° F.
90% over at about 440° F.
End point (dry point) about 450° F.
Specific gravity 60/60° F. about 1.020

In order to produce a composite laminated member that will have good cold-punch characteristics, it is recommended that the resinous composition contain a plasticizer. A highly satisfactory plasticizer for use with the resinous composition of this invention is tall oil. The amount of tall oil employed will be of the order of from about 5% to 17%, by weight, based on the weight of the resinous composition. It has been found that 20% and more of tall oil produces composite laminates having poor punching characteristics in that the laminate tends to delaminate on punching.

Tall oil is a by-product of the manufacture of paper from wood. In the manufacture of paper pulps by certain chemical digestion methods, for example, the sulfate process, there is obtained in addition to pulp, a crude mixture comprising soaps of fatty acids, soaps of rosin acids, unsaponifiable matter, coloring matter, and odor producing components. This crude mixture, when acidified, regenerates rosin acids and fatty acids. The resulting mixture is known as crude or whole tall oil.

The specific composition of tall oil obtained varies with the source of wood and the process of digestion. The principal constituents are rosin acids, fatty acids and unsaponifiable material consisting, in part, of sterols and higher alcohols. Analyses of various tall oils show that the content of rosin acids may vary from about 12% to about 64%, fatty acids from about 30% to about 83% and unsaponifiable material from about 5% to 17%. While tall oil of the above compositions has proved satisfactory as plasticizers for the resinous composition of this invention, it is preferred to employ those tall oils wherein the rosin acid content is relatively high, for example, from about 40% to 75% and higher. There are available commercially several refined tall oils where a substantial amount of fatty acids have been removed from the tall oil by distillation or other means thereby increasing the percentage of rosin acids present. Composite laminated members produced by employing the resinous composition of this invention plasticized with tall oil having a substantial amount of rosin acids present have superior electrical properties to those wherein the tall oil employed contains a relatively small amount of rosin acids.

EXAMPLE II

An example of a highly satisfactory tall oil for use in this invention is one that consists essentially of, by weight, about 51% of fatty acids, about 44% of rosin acids and about 5% of unsaponifiables.

A specific example of the resinous varnish composition of this invention is set forth in the following example:

EXAMPLE III

The following ingredients are placed in a steam-jacketed reaction vessel provided with stirring mechanism and a reflux column:

| | Lbs. |
|---|---|
| Phenol (hydroxy-benzene) | 600 |
| Mixture of substituted phenols of Example I | 300 |
| Formaldehyde (37% aqueous solution) | 612.5 |
| Ethylene diamine (87% aqueous solution) | 3.3 |
| Ammonia (28% aqueous solution) | 3.3 |

The ingredients are heated to reflux and reflux is continued for about 75 minutes. A vacuum of 20 inches of mercury is applied to the reaction vessel to remove water from the reaction product. Water is removed from the reaction product until the reaction product has a clear appearance. The time required to produce a clear reaction product is about one hour. At this point the vacuum is broken and 362.5 pounds of China-wood oil are added to the reaction product. The composition is thoroughly mixed for about three minutes. The vacuum is again applied and the composition is heated slowly to about 120° C. and held at this temperature until the resin is no longer tacky but is dry to the touch, when at room temperature. Heating at about 120° C. for 2¼ hours will usually be sufficient to produce a non-tacky resin composition. This can easily be determined by removing a sample from the kettle and cooling the sample under cold water. After cooling, the resin should be dry to the touch. To this resinous composition there are added 337.5 pounds of ethyl alcohol and 337.5 pounds of toluol to provide an impregnating varnish. The resulting resinous varnish composition comprises about 54% solids content, has a viscosity of about 300 centipoises at 25° C. and a specific gravity of about 1.015 at 25° C.

To prepare a satisfactory impregnating varnish, the solvent to resins solids ratio may be varied from about 40% to 60% by weight.

The resinous composition of Example III can be satisfactorily employed in preparing composite laminated members in accordance with this invention. However, as previously set forth, it is preferred to add to the resinous varnish composition a tall oil plasticizer in order to produce composite laminated members having excellent cold-punch characteristics. Thus, from 5% to 17%, by weight, based on the weight of the resin composition, of tall oil may be added to the resinous varnish composition of Example III to produce highly satisfactory resinous varnish compositions for use in this invention.

Composite laminated members may be produced by employing as a sole impregnant the resinous composition of this invention. However, to provide for improved water adsorption characteristics and improved insulation resistance, it is preferred to pre-treat both the highly purified cellulose paper and the kraft paper with a specific water-soluble phenolic resin varnish prior to impregnating the sheets with the resinous varnish composition of this invention.

A water-soluble phenolic resin which may be employed is the reaction product of phenol and formaldehyde or a reactive polymer of formaldehyde such as paraformaldehyde in the proportions of 1 mol of phenol to 2.5 to 3 mols of the formaldehyde under certain critical conditions to produce a water soluble A-stage phenolic resin. The phenol and formaldehyde are reacted at a reaction temperature of from about 25° C. to 80° C. and at a pH value between 8.4 and 11.5 in the presence of an inorganic catalyst selected from the group consisting of sodium hydroxide, potassium hydroxide, barium hydroxide and calcium hydroxide, in an amount chemically equivalent to between 3 and 42.5 parts of sodium hydroxide per 100 parts by weight of phenol until a water soluble condensation product is formed having a water miscibility of at least 500% and an average molecular weight of between about 225 and 300 as determined by the Menzies-Wright boiling point method.

The reaction temperature should not exceed 80° C. and preferably, is between 50° C. and 75° C. While the reaction of a pH of between 8.4 and 11.5 takes place at temperatures as low as 25° C. in a period of 18 to 72 hours, it is preferred to use elevated temperatures to reduce production time. For example, at a reaction temperature of 70° C., the reaction usually proceeds to the desired end point in one to four hours. After the reaction has been carried to the desired point, the alkaline catalyst in the reaction product is partially neutralized by addition of a water-soluble acid such as hydrochloric acid, sulfuric acid, phosphoric acid and oxalic acid to bring the pH value of the reaction product to a pH range between 6.8 and 7.8.

The salts formed in the partial neutralization step may be soluble or insoluble in the reaction product. For example, a sodium hydroxide catalyzed reaction when partially neutralized with hydrochloric acid yields sodium chloride which is soluble in the phenol-formaldehyde condensate; whereas, a barium hydroxide catalyzed reaction which is neutralized with sulfuric acid yields insoluble barium sulfate, the latter type salt being removed by filtration or decantation. For the purposes of this invention, it is preferred to neutralize the alkaline catalyst with an acid that will produce an insoluble salt. The insoluble salt is then removed.

The reaction product is vacuum dehydrated at a temperature not exceeding 50° C. until substantially all water is removed to provide a water-soluble phenolic resin.

A specific example of the preparation of the water-soluble phenolic resin employed in the invention is illustrated in the following example:

EXAMPLE IV

Into a reaction vessel equipped with an agitator, reflux and distillation column, and steam heating means are charged the following:

| | Parts by weight |
|---|---|
| Phenol | 100 |
| Aqueous solution of formaldehyde (37% formaldehyde content) | 287 |
| 25% aqueous solution of sodium hydroxide | 25 |

Heat is applied to the reaction vessel to raise the temperature of the reaction mixture to about 40–45° C., and is then discontinued as an exothermic reaction is initiated. The temperature of the reaction mass is permitted to rise to 70° C., and then held at this temperature while the reaction mass is refluxed for 1.25 hours. Vacuum distillation is then initiated, the temperature dropping below 50° C. 150 parts of distillate consisting of water and unreacted formaldehyde are collected. The partially dehydrated reaction product is then partially neutralized with 50 parts of a 10% aqueous solution of phosphoric acid. An insoluble sodium phosphate salt is formed. Vacuum distillation at a temperature below 50° C. is reinitiated to remove as rapidly as possible the water added by the aqueous phosphoric acid solution and to further dehydrate the product to yield about 15 parts of distillate, principally water. The insoluble sodium phosphate salt is filtered off. The resultant product is an amber colored liquid having a viscosity of 400 centistokes at 25° C.; a water miscibility of about 2000%; a pH value between 7.3 and 7.6 and a specific gravity between 1.28 and 1.29 at 25° C. Water is added to form a phenolic resin varnish. It has been determined that if too much water is employed in the varnish, the impregnated paper becomes weakened. It is preferred to employ an organic solvent, such as ethanol, in an amount up to about 50% by weight in admixture with water in preparing the varnish.

Ordinary tap water as well as distilled water has been used in producing satisfactory varnish solutions with the aforementioned water soluble phenolic resin. By "water," it is intended to designate not only distilled water but water containing small amounts of salts, dissolved organics, and the like which do not impair the good properties of varnish.

Referring now to FIG. 1 of the drawing, there is illustrated apparatus 10 for the treatment of the paper sheeting, which may be the kraft paper sheeting or the highly purified cellulose paper sheeting employed in this invention. A roll 12 of paper sheeting is disposed at one end of the apparatus 10. The paper sheeting 14 is withdrawn from the roll 12 and passes in a varnish dip pan 16 containing a phenolic resin varnish 18 which comprises water-ethanol solution of the phenolic resin of Example IV, beneath a roller 20, immersed in the phenolic resin varnish 18 so that the sheet material 14 is soaked in the phenolic resin varnish 18. The soaked paper is withdrawn from the phenolic resin varnish 18 and passes between a pair of squeeze rolls 22 where the amount of applied varnish composition is controlled by the setting of the rolls. The bottom side of the treated paper is drawn over a scraper 24 so as to remove any adhering superficial phenolic resin varnish from that one side of the paper. The sheet of fibrous material with the applied phenolic resinous varnish composition then passes into an oven 26 having electrical heating elements 28 or other suitable heating means where the solvent from the varnish is removed. The solvent vapors escape through the stack 30 of the oven.

The treated paper sheeting then passes over roller 32 into the varnish dip pan 34 beneath a roller 36 immersed in varnish composition 38 comprising the phenolic resin varnish composition of this invention, which may or may not be plasticized with tall oil, so that the impregnated paper sheeting is further impregnated with varnish composition 38. The impregnated paper sheeting is withdrawn from the varnish composition 38 and passes between a pair of squeeze rolls 40 where the amount of applied varnish composition is controlled by the setting of the rolls. The bottom side of the treated paper sheeting is finally drawn over a scraper 42 so as to remove any adhering superficial varnish from that one side of the paper sheeting. The treated paper sheeting then passes into oven 44 having electrical heating elements 46 where the solvent from the varnish is removed and the applied resins are advanced to the semi-cured state, that is the B-stage. Solvent vapor escapes through stack 48.

The heat treatment of the applied resins at this stage is conducted so that the resulting treated paper has a "greenness" of from about 1% to 6%. The greenness is determined by placing a stack of small pieces of the resin treated paper in a hot press and pressing it at a temperature of 175° C. and a pressure of 1000 pounds per square inch for five minutes, and then weighing the amount of resin that is forced out of the stack, that is, the resin that extends beyond the paper sheets proper, and determining the proportion of the exuded resin to the total weight of the sample.

The product withdrawn from the oven 44 is a sheet 50 of paper carrying B-stage phenolic resin composition and may be formed into a roll 52, cut, or otherwise handled.

It is to be understood that the method of impregnating the sheet material described above is applicable to both the impregnation of highly purified cellulose paper sheeting and kraft paper sheeting, both of which are employed to form the composite laminated member of this invention.

The paper sheet is impregnated with the water soluble resinous composition to provide a resin ratio of from about 1.0 to about 1.30, a relatively narrow resin ratio of from about 1.15 to 1.17 being preferred. During the second stage of the impregnating process, the papers are treated so as to be provided with a total resin ratio of from about 2.0 to 2.6. Resin ratio is defined as the ratio of the weight of the untreated paper sheeting plus the weight of the resin that is impregnated in the sheet to the weight of the untreated paper.

The following examples are illustrative of this invention:

EXAMPLE V

Six sheets of kraft paper and two sheets of alpha cellulose paper, each sheet being 12 inches square and 10 mils thick, are impregnated with the resinous varnish composition of Example IV. The impregnated sheets are heated to remove all the water from the sheets. The sheets are provided with a resin ratio of the water soluble resin of about 1.16.

The six treated sheets of kraft paper are impregnated with the resinous varnish composition of Example III to which there has been added 15% by weight, based on the weight of the resin solids in the composition alone of the tall oil of Example II. The impregnated paper is heated to remove the volatile solvent of the varnish and to advance the applied resins to the B-stage. The two sheets of treated alpha cellulose paper are treated with the resinous varnish composition of Example III to which there has been added 10% by weight, based on the weight of the resin composition alone, of the tall oil of Example II. The volatile solvent is then removed. All sheets are provided with a total resin ratio of about 2.4 and a greenness of about 1.8%. The six sheets of treated kraft paper are superimposed one upon the other to provide a stack and the one of the two sheets of alpha cellulose paper is placed on the top of the stack and the other on the bottom of the stack to provide a composite stack with the stack of impregnated kraft paper sandwiched between the two sheets of impregnated alpha cellulose paper. The thus prepared composite stack is molded in a press at 1500 pounds per square inch and at a temperature of about 160° C. for a period of time of about 72 minutes to produce a unitary composite laminated member.

The composite laminated member thus produced has a Rockwell M hardness of 100 at 23° C., a dry power factor of about .0308 and an insulation resistance in excess of one million megohms. The composite laminate after being immersed in room temperature (25° C.) water for 24 hours, shows a water adsorption of 0.49% and a wet power factor of about 0.312. The laminate exhibits good cold punch characteristics.

EXAMPLE VI

Six sheets of kraft paper and two sheets of cotton linters paper, each 12 inches square and 10 mils thick, are impregnated with the resinous varnish composition of Example IV. The treated sheets are heated to remove the water. The sheets are provided with a resin ratio of the water soluble phenolic resin of about 1.16. The six sheets of kraft paper and two sheets of cotton linters paper are then impregnated with the resinous varnish composition of Example III (no tall oil plasticizer is employed). The impregnated sheets are heated to remove the volatile solvent. The sheets are provided with a total resin ratio of about 2.4 and a greenness of about 1.8. The six sheets of treated kraft paper are superimposed one upon the other to provide a stack and one of the two sheets of cotton linters paper is placed on top of the stack and the other on the bottom so as to sandwich the stack of kraft paper between the two sheets of cotton linters paper. The thus prepared composite stack is molded in a press at 1500 pounds per square inch and at a temperature of about 160° C. for about 72 minutes to produce a unitary composite laminated member. The composite laminated member has a hardness of 103 on the Rockwell M scale when measured at 23° C. The composite laminated member has a dry power factor of .033 and a wet power factor of .0346, and an insulation resistance of over one million megohms.

Molding at pressures of from about 500 p.s.i. to about 1600 p.s.i. at temperatures of about 140° C. to 180° C. are satisfactory for the purposes of this invention.

Referring to FIG. 2 of the drawing there is shown an exploded view of a composite laminate 60 prepared in accordance with this invention. The composite laminate 60 comprises body layer 62 which comprises resin impregnated sheets 64 of kraft paper and surface layers 66 of resin impregnated sheets of highly purified cellulose paper. While it is preferred to produce a composite laminate having surface layers on both sides thereof (such as shown in FIG. 2), it is to be understood that satisfactory composite laminates which comprise just one surface layer can be satisfactorily prepared. It is also to be understood that the surface layers 66 may comprise a plurality of impregnated sheets of highly purified cellulose paper if desired.

Laminates prepared in accordance with this invention have good physical and electrical properties. In particular, they do not deteriorate or change materially under wet or humid conditions, and are especially applicable for use as base members for printed circuits. The laminates can be cold-punched and when thus punched, exhibit smooth and clean-cut edges, and the laminate does not crack or break during the punching operation.

The composite laminates of this invention have excellent resistance to the hot chlorinated solvents usually employed in removing grease, oil and the like from such laminates when the laminates are employed as base members for printed circuits. The laminates also exhibit excellent resistance to solders heated to a temperature of about 270° C., for short periods of time.

Since certain obvious changes may be made in the above procedure and different embodiments of the invention could be made without departing from the scope thereof, it is intended that all matter contained in the above description shall be interpreted as illustrative and not in a limiting sense.

We claim as our invention:

1. A thermosettable resinous varnish composition comprising:
   (A) one part by weight of the resinous product derived by condensing
      (a) one mol of a mixture of phenols consisting essentially of
         (i) from 0.83 to 0.5 mol percent of a phenol selected from at least one of the group consisting of phenol, cresol and xylenols and
         (ii) from 0.17 to 0.5 mol percent of a blend of substituted phenols comprising from about 85% to 90% by weight of ethyl phenols and isopropyl phenols, and the balance being other substituted phenols, about 90% of the ethyl phenols and the isopropyl phenols being the para isomer and for each part by weight of the isopropyl phenol present there is present from about 1.3 to 1.6 parts by weight of the ethyl phenols, with
      (b) from about 0.7 mol to 1.5 mols of an aldehyde selected from the group consisting of formaldehyde and polymers of formaldehyde, the reaction being effected under reflux conditions in the presence of an alkaline catalyst and then dehydrated until substantially all the water is removed.
   (B) from 0.25 to 0.50 part by weight of a drying oil, and,
   (C) from 0.05 to 0.17 part by weight of tall oil.

2. An electrical grade composite laminated member having cold punching characteristics comprising a core stock of a plurality of sheets of kraft paper faced with a sheet of highly purified cotton cellulose, the sheets of kraft paper and highly purified cotton cellulose being impregnated first with a thermosettable water soluble phenolic resin and secondly with a thermosettable resinous varnish composition comprising:
   (A) one part by weight of the resinous product derived by condensing
      (a) one mol of a mixture of phenols consisting essentially of
         (i) from 0.83 to 0.5 mol percent of a phenol selected from at least one of the group consisting of phenol, cresol and xylenols and
         (ii) from 0.17 to 0.5 mol percent of a blend of substituted phenols comprising from about 85% to 90% by weight of ethyl phenols and isopropyl phenols, and the balance being other substituted phenols, about 90% of the ethyl phenols and the isopropyl phenols being the para isomer and for each part by weight of the isopropyl phenol present there is present from about 1.3 to 1.6 parts by weight of the ethyl phenols, with
      (b) from about 0.7 mol to 1.5 mols of an aldehyde selected from the group consisting of formaldehyde and polymers of formaldehyde, the reaction being effected under reflux conditions in the presence of an alkaline catalyst and then dehydrated until substantially all the water is removed, (B) from 0.25 to 0.50 part by weight of a drying oil, and,
(C) from 0.05 to 0.17 part by weight of tall oil.

References Cited in the file of this patent

UNITED STATES PATENTS

| | | |
|---|---|---|
| 1,730,857 | Mains | Oct. 8, 1929 |
| 2,198,805 | Dillehay | Apr. 30, 1940 |
| 2,345,357 | Powers | Mar. 28, 1944 |
| 2,351,937 | Dreher | June 20, 1944 |
| 2,563,614 | Palmer | Aug. 17, 1951 |
| 2,579,610 | Pitre et al. | Dec. 25, 1951 |
| 2,801,198 | Morris et al. | July 30, 1957 |
| 2,810,674 | Madden | Oct. 22, 1957 |
| 2,817,386 | Counos | Dec. 24, 1957 |